United States Patent
Kamble et al.

(10) Patent No.: US 9,602,441 B2
(45) Date of Patent: Mar. 21, 2017

(54) VIRTUAL STACKING OF SWITCHES

(71) Applicant: International Business Machines Corporation, Armonk, NY (US)

(72) Inventors: Keshav G. Kamble, Fremont, CA (US); Selvaraj Rajan, Fremont, CA (US); Atul A. Tambe, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 14/032,689

(22) Filed: Sep. 20, 2013

(65) Prior Publication Data

US 2015/0085704 A1    Mar. 26, 2015

(51) Int. Cl.
| | |
|---|---|
| *H04L 12/931* | (2013.01) |
| *H04L 12/24* | (2006.01) |
| *H04L 12/775* | (2013.01) |
| *H04L 12/713* | (2013.01) |

(52) U.S. Cl.
CPC .............. *H04L 49/70* (2013.01); *H04L 41/12* (2013.01); *H04L 45/583* (2013.01); *H04L 45/586* (2013.01); *H04L 41/0806* (2013.01)

(58) Field of Classification Search
CPC ...................................................... H04L 49/70
See application file for complete search history.

(56) References Cited

U.S. PATENT DOCUMENTS

| | | |
|---|---|---|
| 5,802,052 A | 9/1998 | Venkataraman |
| 7,339,944 B2 | 3/2008 | Vandenhoudt et al. |
| 2005/0041659 A1 | 2/2005 | Paul et al. |

(Continued)

FOREIGN PATENT DOCUMENTS

| | | |
|---|---|---|
| EP | 1734691 A1 | 12/2006 |
| JP | 2004356792 A | 12/2004 |

(Continued)

OTHER PUBLICATIONS

Barroso et al., "Ethernet Fabric Routing (UETS/EFR) A hierarchical, scalable and secure ultrahigh speed switching architecture". This paper was partially done with the support of Ministry of Education and Science of Spain through project Capital (TEC2004-05622-C04-03/TCM).

(Continued)

*Primary Examiner* — Hassan Kizou
*Assistant Examiner* — Abdullahi Ahmed
(74) *Attorney, Agent, or Firm* — Zilka-Kotab, PC

(57) ABSTRACT

A first processor assigns switches and/or switch ports to a virtual stack according to configuration information and stores the virtual topography of the virtual stack in a mapping table. The mapping table correlates switches, switch ports, computer processors, and virtual stacks. The first processor receives a data unit from a first switch that includes a source address and a destination address. The destination address identifies a switch and switch port. The first processor compares the destination address to the mapping table to determine a second computer processor and sends the data unit to the second computer processor, the second computer processor corresponding to a switch and/or switch port identified in the destination address of the data unit.

17 Claims, 4 Drawing Sheets

(56) References Cited

U.S. PATENT DOCUMENTS

| | | |
|---|---|---|
| 2006/0274656 A1 | 12/2006 | Paul et al. |
| 2007/0253439 A1 | 11/2007 | Iny |
| 2008/0112403 A1* | 5/2008 | Larsen ................ H04L 12/4666 370/389 |
| 2008/0123536 A1* | 5/2008 | Johnson ................ H04L 41/145 370/241 |
| 2009/0245137 A1* | 10/2009 | Hares .................... H04L 41/046 370/254 |
| 2011/0080855 A1 | 4/2011 | Fung |
| 2011/0299534 A1* | 12/2011 | Koganti .............. H04L 12/4625 370/392 |
| 2012/0207039 A1* | 8/2012 | Srinivasan ............. H04L 43/50 370/252 |
| 2014/0029608 A1* | 1/2014 | Ayandeh ................ H04L 12/56 370/355 |
| 2014/0219086 A1* | 8/2014 | Cantu' .................... H04L 47/18 370/231 |

FOREIGN PATENT DOCUMENTS

| | | |
|---|---|---|
| WO | 02062023 A1 | 8/2002 |
| WO | 2009064407 A1 | 5/2009 |

OTHER PUBLICATIONS

"10-Gigabit Ethernet Switch Performance Testing", A White Paper, Ixia, Copyright 2004 Ixia, Calabasas CA., pp. 1-30.

"AT-8000S/24POE Layer 2 Stackable Fast Ethernet Switch", Allied Telesis, Inc., 2009, Bothell WA.

"Avaya Ethernet Routing Switch 4800 Series", Copyright 2013 Avaya Inc., Jan. 2013 DN4815-01, pp. 1-8.

\* cited by examiner

| V_STACK_ID | SWITCH_ID | VSS_CHIP_ID |

US 9,602,441 B2

VIRTUAL STACKING OF SWITCHES

FIELD OF THE INVENTION

The present invention relates generally to the field of network switches, and more particularly to virtual stacking of network switches.

BACKGROUND OF THE INVENTION

Computer networks are commonly used to send and receive data, to share resources, and to provide communication between remote and local users. In the Open Systems Interconnect (OSI) seven-layer reference model, a frame is a unit of data at the data link layer and a packet is a unit of data at the network level. Packets and frames may be referred to generally as data units.

Communication equipment such as network adaptors, routers, and switches are responsible for conveying data from one user to an intended other user using various communication protocols.

Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port.

A stackable switch is a network switch that is fully functional operating standalone but which can also be set up by physical connectivity to operate together with one or more other network switches, with this group of switches showing the characteristics of a single switch but having the port capacity of the sum of the combined switches. Such a group created by physical interconnectivity is a physical network stack. Switches in a physical network stack are called member switches. The member switch that manages the physical network stack is the master switch.

A packet-switched network is a digital communications network that groups all transmitted data, irrespective of content, type, or structure into variable-length packets. The network over which packets are transmitted is a shared network which routes each packet independently from all others and allocates transmission resources as needed. A cell-based network is a digital communications network that uses fixed-length packets, called cells.

SUMMARY

Embodiments of the present invention disclose a method, system, and computer program product for creating one or more virtual stacks of switches and switching data between two or more switches within each virtual stack. A first processor assigns switches and/or switch ports to a virtual stack according to configuration information and stores the virtual topography of the virtual stack in a mapping table. The mapping table correlates switches, switch ports, computer processors, and virtual stacks. The first processor receives a data unit from a first switch that includes a source address and a destination address. The destination address identifies a switch and switch port. The first processor compares the destination address to the mapping table to determine a second computer processor and sends the data unit to the second computer processor, the second computer processor corresponding to a switch and/or switch port identified in the destination address of the data unit.

DETAILED DESCRIPTION

Embodiments of the present invention recognize that physical switch stacking methods support stacking only a finite number of switches and the complexity of stacking connectivity increases as the number of switches increases. Embodiments of the present invention provide a method, system, and computer program product for creating a virtual stack scalable to accommodate any number of switches.

Embodiments of the present invention provide a method, system, and computer program product for creating multiple virtual stacks within the same network or using the same interconnections. A physical stack of switches may be a member of one or more virtual stacks. Further provided is a method, system, and computer program product for creating a virtual stack comprising switches of heterogeneous types.

Embodiments of the present invention recognize that segmenting a network can improve security by isolating parts of the network from other traffic on the network. Embodiments of the present invention provide a method, system, and computer program product for segmenting a network into virtual stacks, which are scalable in size and granular to the level of an individual device or port, enabling the creation of a virtual stack as small as a single device or as large as an entire network of switches. Thus, embodiments of the present invention enable the isolation of parts of the network from other network traffic into segments independent of network topography.

Figure 1:
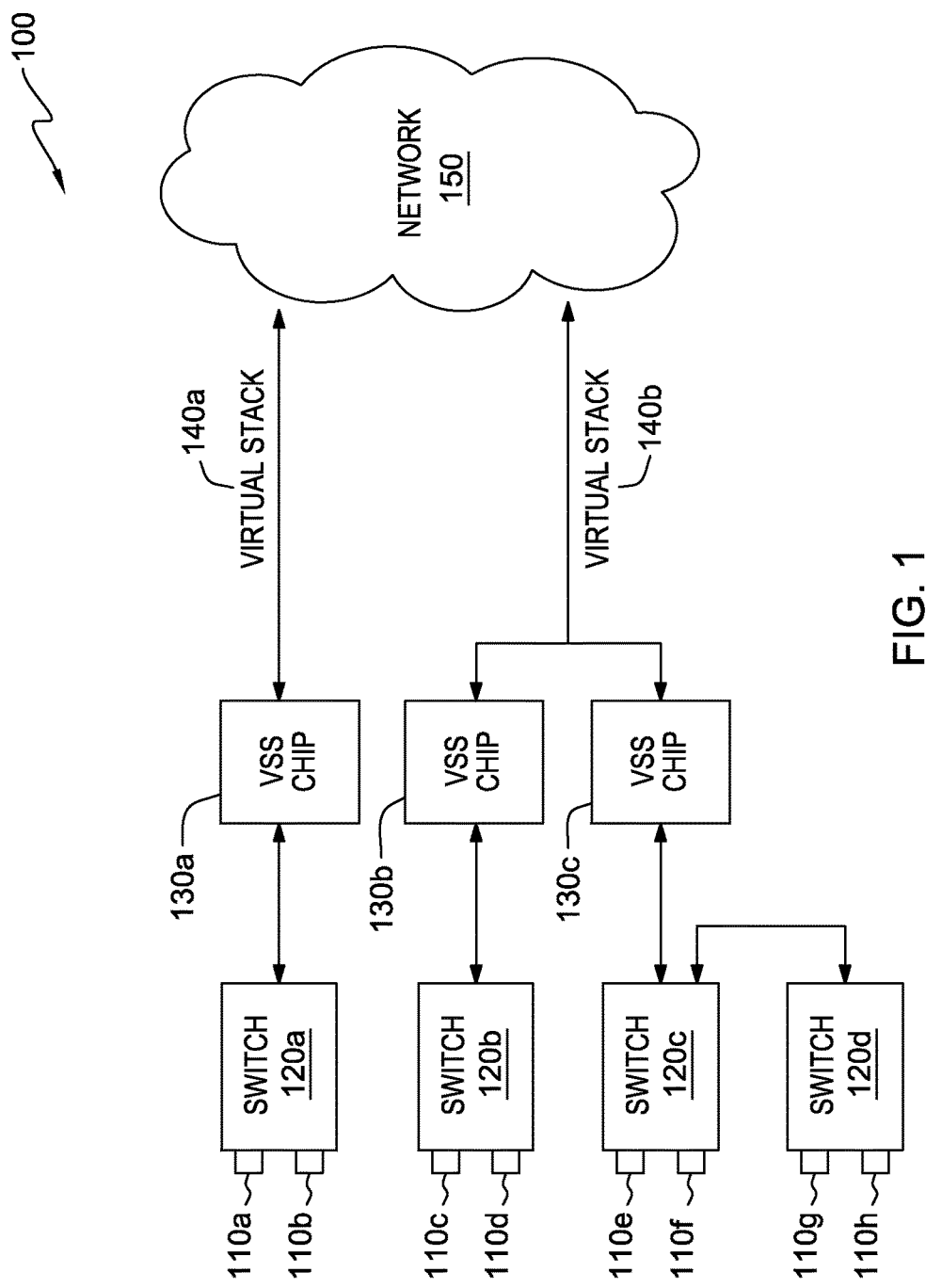
FIG. 1 is a block diagram of a sample computer network environment in which an embodiment of the present invention can be implemented.

FIG. 1 is a block diagram of a sample computer network environment in which an embodiment of the present invention can be implemented.

Computer networking environment 100 includes at least one switch 120*a*-120*d* (generally designated as switch 120), which each have at least one switch port 110*a*-110*h* (generally designated as switch port 110). Computer networking environment 100 may include a greater or fewer number of switches 120 than shown in FIG. 1, each of which may have a greater or fewer number of switch ports 110 than shown in FIG. 1. Each switch 120 can receive data from a device (not shown) via switch port 110. Each switch 120 has at least one switch port 110 and may have, for example, thirty-six or more switch ports 110. Switch port 110 may utilize any of a variety of computer network connections, including wired connections such as Ethernet. Switch 120 may be wirelessly interconnected with a device, in which case switch port 110 refers to the wireless network connection between switch 120 and the device and switch port 110 includes a wireless antenna capable of connecting to one or more devices via a wireless network protocol, such as 802.11.

Switch 120 may comprise a plurality of switches 120 which are configured into a physical stack of switches. In the depicted embodiment, switch 120d and switch 120c are stackable switches in a configuration creating a physical stack of switches, wherein switch 120c is the master switch of the physical stack. In this case, switches 120c and 120d are treated as though they are a single switch 120 with a quantity of switch ports 110 equal to the sum of the quantity of switch ports 110 of switches 120c and 120d.

Switch 120 receives data from a device. The device may be a personal computer laptop computer, a tablet computer, a netbook computer, a personal computer (PC), a desktop computer, a personal digital assistant (PDA), a smart phone, or any programmable electronic device capable of communicating with switch 120 via downstream switch port 110. The data that the device sends to switch 120 via switch port 110 may be packets (including cells), frames, or another format.

Computer networking environment 100 also includes at least one virtual stacking and switching chip ("VSS chip") 130a-130c (generally designated as VSS chip 130). Computer networking environment 100 may include a greater number of VSS chips 130 than shown in FIG. 1. In an embodiment, each switch 120 is connected to one VSS chip 130, which interfaces switch 120 with network 150, wherein each VSS chip 130 communicates with one or more other VSS chip 130 via network 150.

The functionality described herein in connection with VSS chip 130 may be implemented in hardware, in software, or in a combination of hardware and software. In some embodiments, the functionality of VSS chip 130 is implemented by a server computer system, such as the server computer system depicted in FIG. 5 and described in the accompanying discussion. For example, the present invention may be implemented as a virtual stacking and switching program ("VSS program"), which may comprise software (firmware, resident software, micro-code, etc.) and/or a computer program product embodied in one or more computer-readable medium(s) having computer-readable program code embodied thereon. In an embodiment, the VSS program implements the methods of the present invention, including those methods depicted in FIGS. 2-4 and described in the respective accompanying discussions. In an embodiment, VSS chip 130 executes VSS program.

VSS chip 130 is a networking device, computer processor, or application-specific integrated circuit (ASIC) capable of storing and executing programmable instructions and capable of generating, receiving, and processing data units. VSS chip 130 may send and receive data units from a switch (e.g., switch 120) or another VSS chip 130. VSS chip 130 may communicate with one or more other VSS chips 130 via network 150. In some embodiments, the data units are packets or frames.

In an embodiment, VSS chip 130 may comprise a processor or an integrated circuit, for example, an application-specific integrated circuit. In an embodiment, VSS chip 130 further comprises internal storage storing a mapping table. In an embodiment, the mapping table comprises one or more records correlating identifiers corresponding to switch 120, virtual stack 140, and VSS chip 130.

In an embodiment, network 150 comprises a plurality of interconnected network devices capable of switching data units received from VSS chip 130 according to data contained in the header of the data units. In an embodiment, VSS chip 130 comprises a plurality of outputs interconnecting VSS chip 130 with network 150, in which case the mapping table may include an entry identifying each of the plurality of outputs.

VSS chip 130 converts frames received from switch 120 into packets. In an embodiment, the frames each comprise a frame header and/or stacking metadata. Computer networking environment 100 includes at least one virtual stack 140a-b (generally designated as virtual stack 140) and may include a greater or lesser number of virtual stacks 140 than depicted in FIG. 1. VSS chip 130 creates one or more virtual stacks (e.g., virtual stack 140) of switches (e.g., switch 120). Virtual stack 140 is a logical arrangement of an arbitrary number of switches (e.g. switch 120) which all operate together to show to a network (e.g., network 150) the characteristics of a single switch.

Switches which are a part of a virtual stack are member switches of the virtual stack. An empty virtual stack contains no member switches. A virtual stack may have any number of member switches, each of which may have any number of switch ports 110. In an alternate embodiment, VSS chip 130 may impose limits on the size of a virtual stack, such as by limiting the number of switches 120 or by limiting the number of switch ports 110 which may belong to a virtual stack. Such limitations may vary from one virtual stack to another.

Switch 120 may be a member of more than one virtual stack by VSS chip 130 assigning a first switch port 110 of switch 120 to a first virtual stack and a second switch port 110 of switch 120 to a second virtual stack. For example, in an environment with three twelve-port switches where two virtual stacks are desired, the two virtual stacks may have an equal number of switch ports 110, resulting in each virtual stack having an equal capacity for devices.

A device connected to switch port 110 of switch 120 is associated with a virtual stack by virtue of the association of switch port 110 to the virtual stack. Devices associated with each virtual stack 140 are communicatively isolated at the local level from devices associated with each other virtual stack. Thus, if switch 120a is a member of virtual stack 140a and switch 120b is a member of virtual stack 140b, then VSS chip 130 does not route or switch any data packet from switch 120a to switch 120b. However, a device connected to switch 120a may still be able to communicate with a device connected to switch 120b using non-local traffic, such as through the Internet.

In an embodiment, VSS chip 130a forms virtual stack 140a with switch 120a as a member switch. VSS chip 130b and/or VSS chip 130c form virtual stack 140b with switches 120b-d as member switches. In the depicted embodiment, switches 120c and 120d are physically stacked and so appear as one switch to VSS chip 130c. Thus, when VSS chip 130c adds switch 120c to virtual stack 140b, switch 120d is also added. See FIG. 2 and the accompanying discussion for more detail.

VSS chip 130 switches packets between switches (e.g., switch 120). See FIG. 3 and the accompanying discussion for more detail.

It should be understood that the quantities of elements shown in FIG. 1 are shown for illustration only. For example, a greater or lesser number of VSS chips 130 may arrange a greater or lesser number of switches 120 into a greater or lesser number of virtual stacks 140.

In an embodiment, network 150 may be a cell-based network, for example a one employing asynchronous transfer mode. In alternate embodiments, network 150 may be a packet-based or frame-based network. VSS chip 130 translates data received from switch 120 into the format appropriate for the protocols employed by network 150. Network 150 may be, for example, a local area network (LAN), a wide area network (WAN) such as the Internet, or a combination of the two, and can include wired, wireless, or fiber optic connections. In general, network 150 may be any combination of connections and protocols that will support communications between VSS chips 130 and other networking devices (e.g., a switch).

VSS chip 130 sends data to network 150 via an output port. In an embodiment, the output port of VSS chip 130 comprises a serializer/deserializer (SerDes) chip, which converts data to and from serial and parallel formats.

Figure 2:
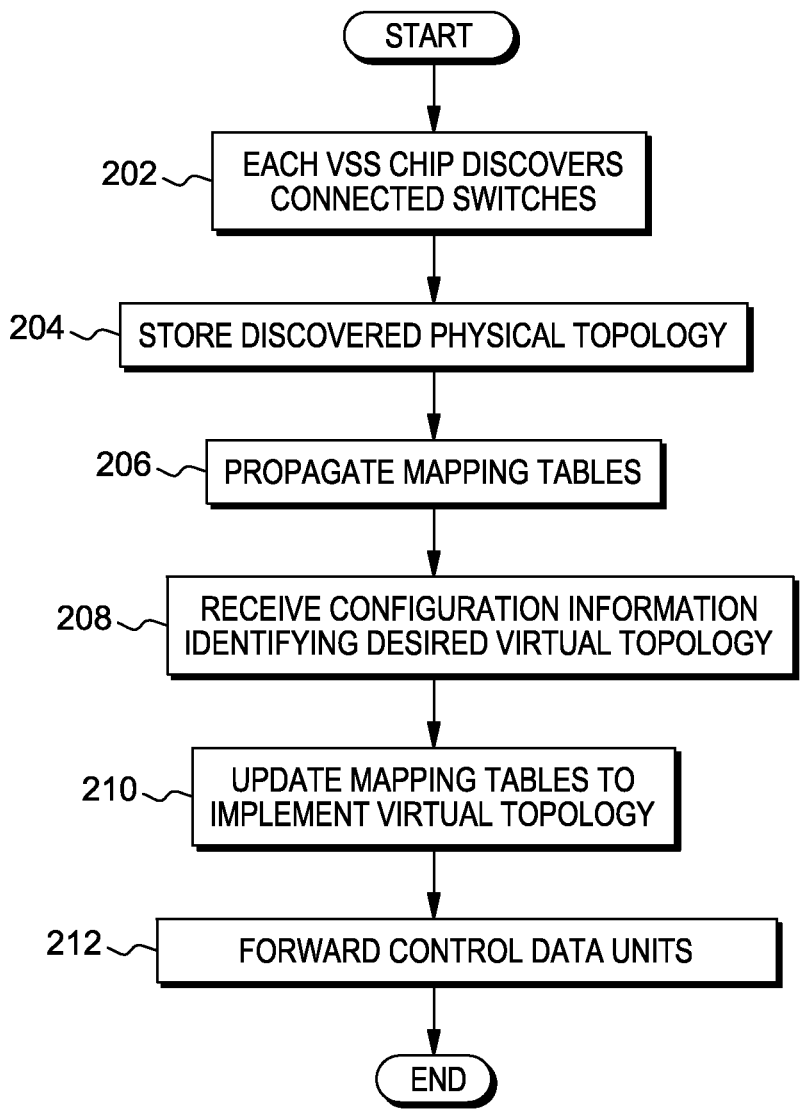
FIG. 2 is a flowchart depicting a method of creating a virtual stack, in accordance with an embodiment of the present invention.

FIG. 2 is a flowchart depicting a method of creating a virtual stack, in accordance with an embodiment of the present invention.

Each VSS chip 130 discovers the switches connected to the VSS chip 130 (step 202). In an embodiment, VSS chip 130 discovers switch 120.

In an embodiment, VSS chip 130 sends a switch discovery signal to switch 120. In response, switch 120 sends a reply to VSS chip 130 including an identifier of switch 120 (e.g., a MAC address or IP address) and the quantity of switch ports 110 of switch 120. Switch 120 may be a member or master switch of a physical stack, in which case the quantity of switch ports 110 comprises the total quantity of switch ports 110 of the physical stack. In an alternate embodiment, the switch discovery signal complies with a protocol such as Internet Router Discovery Protocol or other stack topology discovery protocols.

Each VSS chip 130 stores the discovered switch information in a mapping table (step 204).

Figures 3, 4:
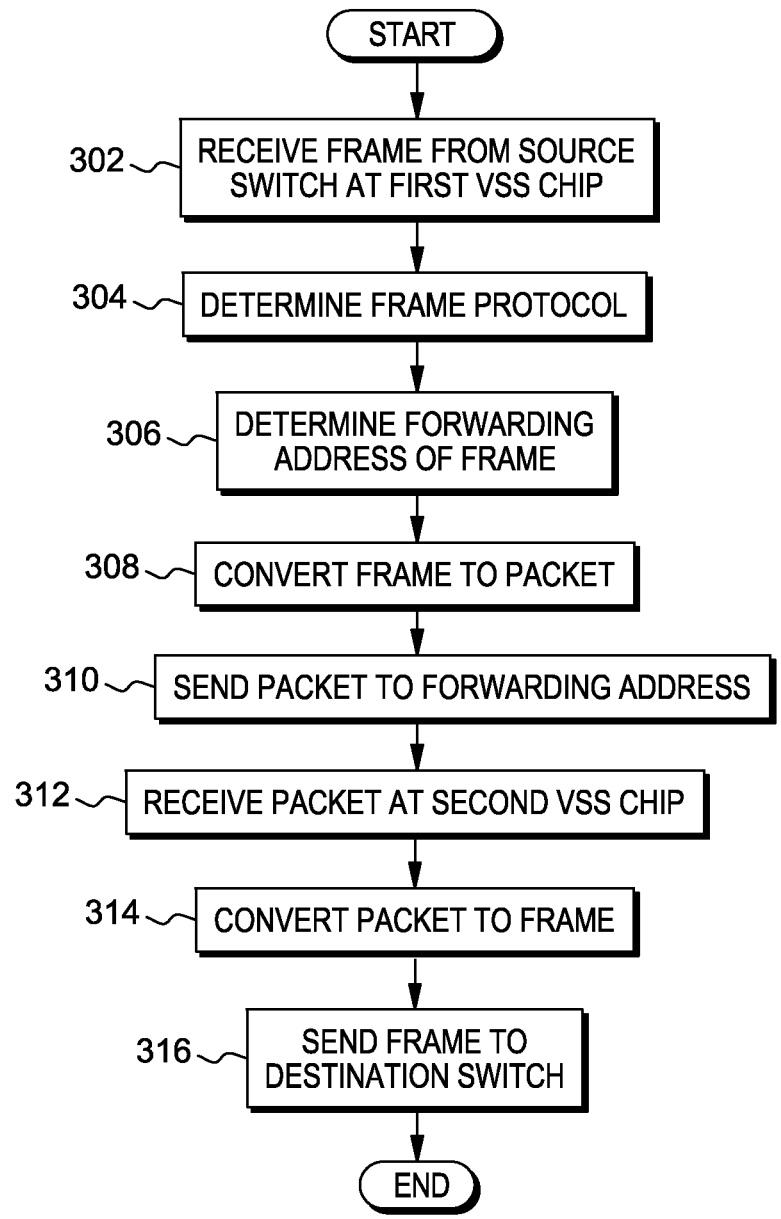
FIG. 3 is a flow diagram depicting a process of switching data within a virtual stack, using the VSS program of FIG. 2, in accordance with an embodiment of the present invention.
FIG. 4 depicts a format of a mapping table according to an embodiment of the present invention.

Each VSS chip 130 stores a mapping table, as depicted in FIG. 4, according to an embodiment of the invention. The mapping table correlates a plurality of entries, which includes a V_STACK_ID identifying a virtual stack, a SWITCH_ID identifying a switch, and a VSS_CHIP_ID identifying a VSS chip. In an embodiment, each VSS chip 130 comprises a mapping table, and each VSS chip 130 creates a record in its mapping table for each switch connected to the VSS chip 130.

For example, VSS chip 130*b* is connected to switch 120*b*. VSS chip 130*b* comprises a mapping table and VSS_CHIP_ID identifying VSS chip 130*b*. VSS chip 130*b* receives a SWITCH_ID from switch 120*b* in response to VSS chip 130*b* sending a switch discovery signal to switch 120*b*. VSS chip 130*b* stores VSS_CHIP_ID and SWITCH_ID in a first record of the mapping table. VSS chip 130*b* stores V_STACK_ID in the first record as part of step 210.

In an embodiment, the plurality of entries of the mapping table also includes a SWITCH_PORT_ID identifying a switch port. A switch may be a member of more than one virtual stack, for example if one or more switch ports of the switch are members of a first virtual stack and one or more other switch ports of the switch are members of a second virtual stack. VSS chip 130 may store a record in the mapping table for each switch port of a switch, each such record correlating the V_STACK_ID, SWITCH_ID, VSS_CHIP_ID, and SWITCH_PORT_ID. In an embodiment, VSS chip 130 may receive a SWITCH_PORT_ID corresponding to each switch port of switch 120 as part of step 202, in which case VSS chip 130 may populate the mapping table with the SWITCH_PORT_ID as part of step 204. Alternatively, VSS chip 130 may populate the SWITCH_PORT_ID entity as part of step 210.

Each VSS chip 130 propagates its mapping table to each other VSS chip 130 (step 206). In an embodiment, VSS chip 130 sends its mapping table to all other VSS chips 130 of computer networking environment 100 via network 150. Each VSS chip 130 merges its mapping table with the mapping tables received from each other VSS chip 130.

In an alternate embodiment, a first VSS chip of a plurality of VSS chips receives a mapping table from each other VSS chip of the plurality of VSS chips. The first VSS chip merges the changes of each received mapping table into a master mapping table, which the first VSS chip sends to each other VSS chip of the plurality of VSS chips.

VSS chip 130 receives configuration information, which identifies the desired virtual topology (step 208). The configuration information identifies a quantity of virtual stacks to create and a quantity of switches for each virtual stack. The configuration information may also designate particular switches to particular virtual stacks.

In an embodiment, VSS chip 130 receives the configuration information from a client device connected to switch 120. In various embodiments, VSS chip 130 receives the configuration instructions as user input, by retrieving the configuration information from a database, by retrieving the configuration instructions from internal storage, or from another VSS chip 130.

The configuration information may identify a quantity of switch ports, rather than a quantity of switches, to associate with a virtual stack. For example, in an environment with fifteen switches of twelve switch ports each, the configuration information may specify two virtual stacks of ninety switch ports each. The switch ports may be selected for each virtual stack at random from among all of the switch ports or, alternatively, the switch ports may be selected with a preference for keeping switch ports of a switch in the same virtual stack.

The configuration information may identify a fractional quantity of switches. For example, in an environment with fifteen switches of twelve switch ports each, the configuration information may specify two virtual stacks of seven and a half switches each. In this case, six of the switch ports of a switch are assigned to a first virtual stack and the remaining six switch ports are assigned to a second virtual stack.

In an embodiment, a VSS chip defaults to associating switch ports of a switch with virtual stacks in proportion to the number of virtual stacks to which that switch is assigned. For example, if the configuration information specifies that a switch belongs to two virtual stacks, then the VSS chip may default to associating half of the switch ports of the switch to each virtual stack. The configuration information may override this default with a value corresponding to at least one of the virtual stacks, such as a quantity of switch ports or a proportion of switch ports.

In an embodiment, one or more switch ports may indefinitely remain unassociated with a virtual stack. In this case, the configuration information need not associate every switch port with a virtual stack. A switch port which is unassociated with a virtual stack may be denied access to other switch ports and/or to network 150. The switch port may be allowed to communicate with VSS chip 130, such as for connection to a management interface.

VSS chip 130 implements the virtual topology specified in the configuration information by updating each mapping table (step 210).

In an embodiment, each VSS chip 130 comprises a mapping table and each mapping table includes a record corresponding to each switch 120. The configuration instructions comprise a virtual stack identifier corresponding to each switch. The VSS chip stores the virtual stack identifier corresponding to a switch as the V_STACK_ID value in the record corresponding to the switch in the mapping table of the VSS chip. Thus, each switch is a member of the virtual stack identified by the V_STACK_ID identifier for the switch.

In an alternate embodiment, VSS chip 130 may update the mapping table with a plurality of virtual stack identifiers for a switch, in which case VSS chip 130 creates a plurality of records in the mapping table corresponding to the switch, each record corresponding to the switch, to a virtual stack of the plurality of virtual stacks, and to one or more switch ports of the switch. The switch ports identified in each record correspond to the virtual stack identified in the record.

VSS chip 130 propagates the updated mapping table. In an embodiment, VSS chip 130 propagates the updated mapping table by the same method as employed in step 206. In another embodiment, VSS chip 130 propagates the updated mapping table by one of the other methods discussed in connection with step 206.

VSS chip 130 forwards control data units among switches 120 (step 212). VSS chip 130 receives a control data unit from switch 120. VSS chip 130 forwards the control data unit to one or more other VSS chips 130 via network 150, and the one or more other VSS chips 130 forward the control data unit to one or more other switches 120. The control data unit may be unicast, multicast, or broadcast. A unicast control data unit designates a single destination switch. A multicast control data unit designates a plurality of destination switches. A broadcast control data unit designates all switches in the physical topology as destination switches. Whether the control data unit is unicast, multicast, or broadcast may be controlled by the switch sending the control data unit, the VSS chip, or a combination thereof. For example, VSS chip 130 may receive a broadcast control data unit, but may restrict the control data unit to multicast in order to exclude certain switches (e.g., switches which are unassigned to a virtual stack). In an embodiment, each VSS chip 130 broadcasts all control data units received from a switch to all other switches.

In an embodiment, VSS chip 130 forwards a control data unit to all destinations designated in the control data unit, regardless of virtual stacks. A control data unit may comprise an Ethernet frame following a protocol such as link layer discovery protocol or another discovery protocol, such as a proprietary discovery protocol.

FIG. 3 is a flow diagram depicting a process of switching data within a virtual stack, using the VSS program of FIG. 2, in accordance with an embodiment of the present invention. In an embodiment, VSS chip 130 executes VSS program.

A first VSS chip receives a frame from a source switch (step 302). The frame may include a data payload and a frame header. In an embodiment, the frame header comprises a source address, a destination address, and a protocol. The source and destination addresses may each be a MAC address, such as a MAC address of a switch or switch port. The frame header may further comprise a destination switch identifier and/or stacking metadata. The frame follows a protocol, such as the HiGig™ protocol (HiGig is a trademark of Broadcom Corporation) or the Interlaken protocol.

In an embodiment, the source switch is a stackable switch and the frame received from the source switch comprises a frame header that includes stacking metadata. The stacking metadata may vary depending upon the stacking protocol utilized by the stackable switch. VSS chip 130 (e.g., the first VSS chip) may determine the stacking protocol utilized by the stackable switch. The stacking metadata may include a stack identifier, which identifies a stack to which the switch belongs. In an embodiment, the stack identifier of the stacking metadata of a frame of a switch port matches the virtual stack identifier of a mapping table, wherein the virtual stack identifier corresponds to the switch port.

The first VSS chip determines the protocol followed by the frame (step 304). In an embodiment, the frame header identifies the protocol followed by the frame. A frame header may include a protocol header identifying the protocol. For example, a frame header including a HiGig™ header identifies the frame as following the HiGig™ protocol.

The first VSS chip determines the forwarding address of the frame (step 306). In an embodiment, the forwarding address comprises one or more VSS chip identifiers. For example, the forwarding address may comprise one VSS chip identifier for a unicast frame or a plurality or VSS chip identifiers for a multicast or broadcast frame.

In an embodiment, the frame header includes a virtual stack identifier corresponding to the source and a switch identifier corresponding to the destination. A mapping table of the first VSS chip comprises one or more records, each record correlating a SWITCH_ID identifying a switch, a V_STACK_ID identifying a virtual stack, and a VSS_CHIP_ID identifying a VSS chip, wherein the switch is a member of the virtual stack and is interconnected with the VSS chip. The first VSS chip determines the forwarding address by comparing the virtual stack identifier and switch identifier of the frame header to the mapping table and determining a VSS chip identifier.

In this embodiment, matching the virtual stack identifier of the frame header (which identifies the virtual stack of the frame source) to the virtual stack identifier of the mapping table (which identifies the virtual stack of the destination switch) verifies that the source and destination are members of the same virtual stack. If the mapping table of the first VSS chip does not contain a record corresponding to both the virtual stack identifier and the switch identifier, then the destination is not valid and the first VSS chip drops the frame. Data frames and packets may be switched only within a virtual stack, but control data units sent during network discovery (see step 212 and accompanying discussion) may be switched between and among virtual stacks.

In an embodiment, the destination address of the frame header may be a MAC address of a switch port, in which case the first VSS chip maintains a mapping table comprising one or more records, each record correlating a switch to one or more MAC addresses of switch ports of the switch. The first VSS chip determines the forwarding address by correlating the MAC address to a switch identifier and determining a VSS chip identifier corresponding to the switch identifier.

In an embodiment, the destination address of the frame header is a multicast index, in which case the first VSS chip maintains a multicast index table comprising one or more records, each record correlating a multicast index to one or more MAC addresses. Each record may further correlate a multicast index to one or more other multicast indexes, in which case second and subsequent references to a given multicast index may be ignored in order to prevent recursion. The first VSS chip determines the forwarding address by compiling a list of VSS chip identifiers, wherein each VSS chip identifier corresponds to a switch comprising a switch port, the switch port corresponding to a MAC address of the multicast index table.

In an embodiment, the destination address of the frame header is a broadcast indicator, in which case the forwarding address comprises all VSS chip identifiers corresponding to the virtual stack identifier of the frame header. Thus, a frame broadcasted from a member of a virtual stack is addressed to every other member of the virtual stack.

In an embodiment, if the first VSS chip determines that the forwarding address is composed of the VSS chip identifier corresponding to the first VSS chip, the first VSS chip skips steps 308-314.

The first VSS chip converts the frame into a packet (step 308). The packet comprises a packet header, which includes at least the destination address. In an embodiment, a packet is carried as a payload within a frame, in which case converting from a frame to a packet comprises removing the packet from the encapsulation of the frame.

In an embodiment, the packet comprises one or more cells, in which case converting a frame to a packet comprises segmenting the packet into one or more cells. Each of the one or more cells is of equal length to one another and each comprises a cell header. The first VSS chip may segment the frame into cells following a protocol of a cell-based network, such as asynchronous transfer mode. In this embodiment, network 150 is a cell-based network and each VSS chip 130 switches the one or more cells toward their destination by sending the one or more cells to their forwarding destination.

The first VSS chip sends the packet to the forwarding address (step 310). In an embodiment, the forwarding address identifies a second VSS chip, wherein both the first and second VSS chips are interconnected by a network (e.g., network 150). In an embodiment, the first VSS chip sends the packet to the second VSS chip via network 150. In an embodiment, the first VSS chip sending the packet by initiating to send the first VSS chip, establishing a connection with the forwarding address, and transferring the packet to the forwarding address via the connection.

In an embodiment, the first VSS chip compares both the destination address to a mapping table to determine the forwarding address. The forwarding address identifies at least one second VSS chip. The destination address may include one or more destination switch identifiers and/or one or more destination switch port identifiers. In an embodiment, the forwarding address identifies at least one second VSS chip corresponding to a destination switch identifier and destination switch port identifier of the destination address.

In various embodiments, the destination address may be unicast, multicast, or broadcast. A unicast destination address contains a destination switch port identifier and may contain a destination switch port identifier, wherein both correspond to a virtual stack to which the source address also corresponds.

In another embodiment, a multicast destination address identifies a plurality of destination switches or destination switch ports, each corresponding to a virtual stack to which the source address also corresponds. In another embodiment, a multicast destination address may identify a multicast index of a multicast table, the multicast index identifying a plurality of destination switches or destination switch ports, each corresponding to a virtual stack to which the source address also corresponds.

In another embodiment, a broadcast destination address identifies a virtual stack identifier. The broadcast destination address may also includes a broadcast identifier identifying the destination address as a broadcast. In this case, the forwarding address includes all VSS chips corresponding to the virtual stack identifier by at least one record of the mapping table of the first VSS chip. The first VSS chip sends the frame to the one or more VSS chips via the network (e.g., network 150).

A second VSS chip receives the packet from the first VSS chip (step 312). The packet includes a packet header comprising a destination address. The second VSS chip may be one of a plurality of VSS chips identified in the destination address of the packet header and/or in the forwarding address.

The second VSS chip converts the packet back to a frame (step 314). In an embodiment, the second VSS encapsulates the packet in a frame by pre-pending the packet with a frame header.

In an alternate embodiment, the packet comprises one or more cells, in which case the second VSS reconstitutes from the cells the segments of the packet. The content of the reconstituted packet matches the content of the packet before segmentation into cells, including the packet header. The second VSS chip encapsulates the reconstituted packet with a frame, which may comprise pre-pending the reconstituted packet with a frame header.

The second VSS chip sends the frame to the destination switch (step 316). In an embodiment, the VSS chip sends the frame to the switch with which the VSS chip is interconnected. For example, a packet header may identify switch 120a as the destination switch, in which case VSS chip 130a may convert the packet to a frame and send the frame to switch 120a.

In an embodiment, the second VSS chip verifies that the destination address and source address correspond to the same virtual stack. For example, the VSS chip may compare the switch identifier and switch port identifier of the source address to a mapping table to determine a source virtual stack identifier, the switch identifier and switch port identifier of the destination address to the mapping table to determine the destination virtual stack identifier, and compare the source virtual stack identifier to the destination virtual stack identifier.

In an embodiment, the second VSS chip verifies that the switch to which the VSS chip is interconnected is the destination chip. For example, the second VSS chip may compare the destination switch identifier to the mapping table to verify that the destination switch identifier corresponds to the VSS chip identifier of the second VSS chip.

In an embodiment, the second VSS chip modifies the destination address to remove any switch identifiers or switch port identifies which correspond to a virtual stack other than the virtual stack of the source address.

As will be appreciated by one skilled in the art, the invention includes various alternative embodiments. For example, in an embodiment, a first switch 120 of a plurality of switches 120 is a master switch of a virtual stack and all other switches 120 of the virtual stack are slave switches. The master switch of the virtual stack manages the other switches of the virtual stack in the same manner as a master switch of a physical stack may manage the other switches of a physical stack.

The master switch may be determined by a variety of methods, such as by random selection, selection by user input, or selection based on an identifier corresponding to each switch. For example, the master switch may be the switch 120 with the lowest SWITCH_ID value of a plurality of switches 120. The first switch assigned to a virtual stack may be designated as master switch of the virtual stack. All switches of a virtual stack may be eligible to serve as master switch. The master switch may change from time to time. For example, if the master switch is removed from the environment, then another of the plurality of switches 120 becomes the master switch.

The master switch may provide a common management interface, which may be, for example, a command line interface or a graphical interface. The common management interface may display information regarding one or more VSS chips 130, one or more switches 120, and/or one or more virtual stacks 140. The master switch may receive user input, for example via the common management interface. The user input may include configuration information. The master switch may provide the common management interface via a TCP/IP connection with a client device (e.g., a device connected to switch 120). The master switch may propagate configuration information or other information received by user input to one or more VSS chips 130.

In another embodiment, the logic described in connection with VSS chip 130 is distributed among multiple components. For example, one component may manage creation of virtual stacks, while another component converts frames to and from packets, while another component switches packets.

In various embodiments, the above may be implemented in hardware, in software, or in a combination of hardware and software. For example, the system and methods depicted in FIGS. 1-4 may be implemented as a program running on a server computer system, such as in accordance with FIG. 5 and the accompanying discussion. As a further example, the functionality of more than one VSS chip 130 as described herein may be implemented using a physical devices, including a computer system, such as a computer system in a in accordance with FIG. 5 and the accompanying discussion.

Figure 5:
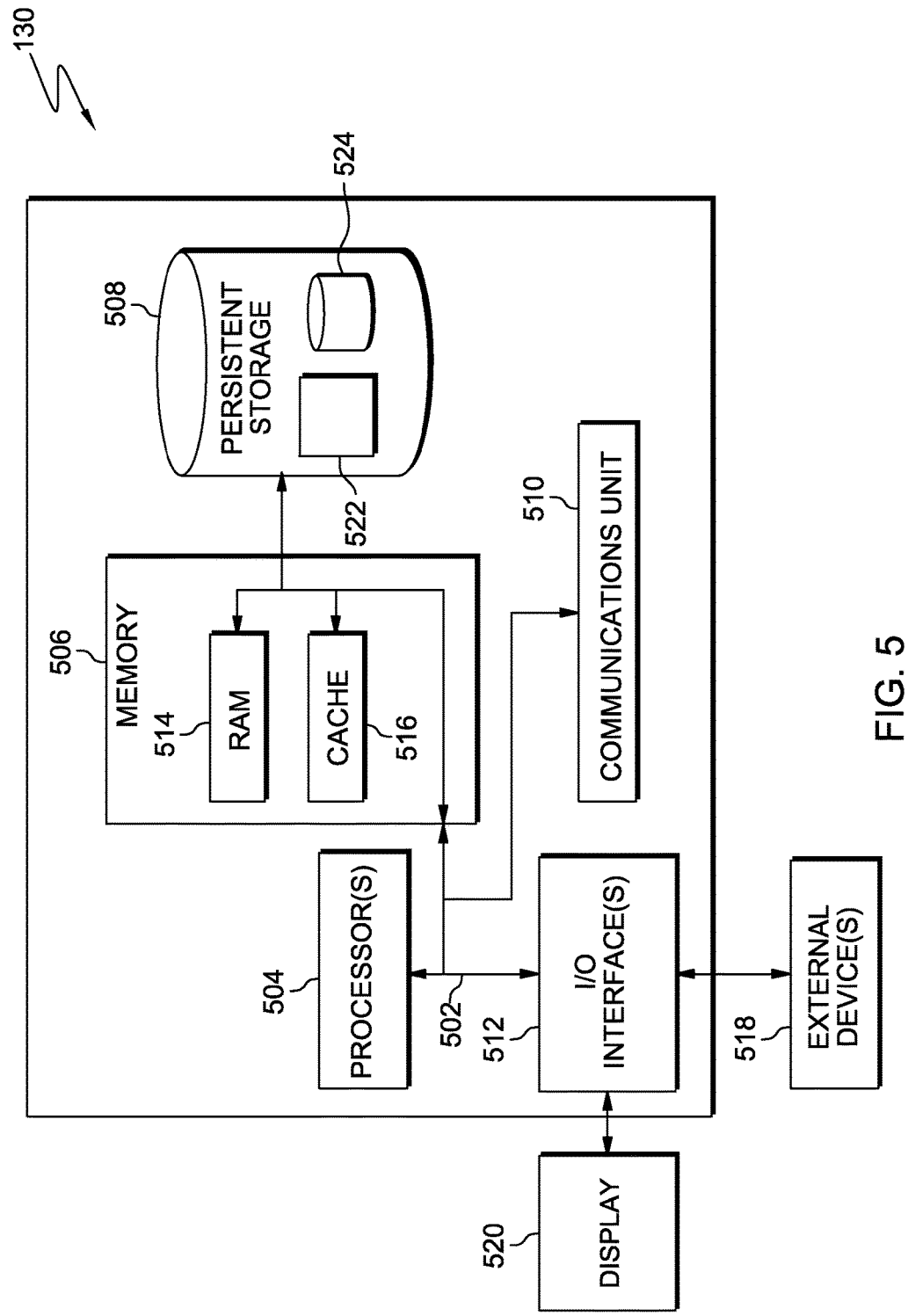
FIG. 5 depicts a block diagram of components of a server computer system executing a virtual stacking and switching program, in accordance with an embodiment of the present invention

FIG. 5 depicts a block diagram of components of computer system 500, which may be a server computer system, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

VSS program 522 and mapping table 524 are stored in persistent storage 508 for execution and/or access by one or more of the respective computer processors 504 via one or more memories of memory 506. Computer processor(s) 504 may include a general-purpose computer processor, application-specific integrated circuit (ASIC) or other integrated circuit. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including switch 120 and network 150. In these examples, communications unit 510 includes one or more network interface cards. Communications unit 510 may provide communications through the use of either or both physical and wireless communications links. VSS program 522 and mapping table 524 may be downloaded to persistent storage 508 through communications unit 510.

I/O interface(s) 512 allows for input and output of data with other devices that may be connected to computer system 500. For example, I/O interface 512 may provide a connection to external devices 518 such as a keyboard, a keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., VSS program 522 and mapping table 524, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

What is claimed is:

1. A method comprising:
a first computer processor receiving configuration information identifying at least one virtual stack to create, each of the at least one virtual stack being a logical arrangement of a plurality of switches which operate together as a single switch;
the first computer processor determining a virtual topology for the at least one virtual stack based on the configuration information, the configuration information comprising a quantity of the at least one virtual stack to create and a quantity of switches to assign to each of the at least one virtual stack;
the first computer processor creating a first virtual stack of the at least one virtual stack, the creating the first virtual stack comprising assigning at least one switch port of a source switch to the first virtual stack of the at least one virtual stack in accordance with the configuration information;
the first computer processor storing the virtual topology in a mapping table local to a computer comprising the first computer processor;
designating, by the first computer processor, a switch of the plurality of switches as a master switch of the at least one virtual stack;
receiving, by the first computer processor, the configuration information from the master switch; and
sending, by the first computer processor, the configuration information to at least one other computer processor that manages another virtual stack not managed by the first computer processor.

2. The method of claim 1, further comprising:
receiving, from the source switch, a data unit comprising a source address and a destination address;
determining the first virtual stack corresponding to the source address;
determining a second computer processor corresponding to the destination address and the first virtual stack;
associating a header with the data unit, the header identifying the first virtual stack and the destination address; and initiating to send the data unit to the second computer processor.

3. The method of claim 2, wherein:
the source address identifies the source switch and a source switch port of the source switch; and
the destination address identifies a destination switch and a destination switch port of the destination switch.

4. The method of claim 1, further comprising:
creating a second virtual stack, wherein the creating the second virtual stack comprises assigning a first switch port of a first switch to the second virtual stack; and
creating a third virtual stack, the creating the third virtual stack comprises assigning a second switch port of the first switch to the third virtual stack,
wherein the first computer processor is restricted from sending data packets received from a switch in the first virtual stack to a switch in the second virtual stack.

5. The method of claim 2, wherein initiating to send the data unit to the second computer processor further comprises:
segmenting the data unit into one or more cells, each cell comprising a cell header, each cell header comprising the destination address;
initiating to send the one or more cells to the second computer processor via a cell-based network; and
reconstituting, by the second computer processor, the data unit from the one or more cells.

6. The method of claim 1, further comprising:
the first computer processor sending a switch discovery signal to one or more of the plurality of switches connected to the first computer processor; and
the first computer processor receiving a reply to the switch discovery signal from the one or more of the plurality of switches connected to the first computer processor, each reply comprising a switch identifier (ID) and a quantity of ports, wherein the configuration information further comprises switch IDs and a quantity of ports in the at least one virtual stack.

7. The method of claim 1, wherein receiving configuration information further comprises:
the first computer processor providing a management interface to a user; and
the first computer processor receiving configuration information via the management interface from the user, the configuration information corresponding to the at least one virtual stack.

8. A computer program product comprising:
one or more computer-readable storage media having program instructions embodied therewith, the embodied program instructions executable by a processor to cause the processor to:
receive configuration information identifying at least one virtual stack to create, each of the at least one virtual stack being a logical arrangement of a plurality of switches which operate together as a single switch;
determine a virtual topology for the at least one virtual stack based on the configuration information, the configuration information comprising a quantity of the at least one virtual stack to create and a quantity of switches to assign to each of the at least one virtual stack;
create a first virtual stack of the at least one virtual stack, comprising assigning at least one switch port of a source switch to the first virtual stack of the at least one virtual stack in accordance with the configuration information;

store the virtual topology in a mapping table local to a computer comprising the processor;
designate a switch of the plurality of switches as a master switch of the at least one virtual stack;
receive the configuration information from the master switch; and
send the configuration information to at least one other computer processor that manages another virtual stack not managed by the processor.

9. The computer program product of claim 8, wherein the embodied program instructions cause the processor to:
receive, from the source switch, a data unit comprising a source address and a destination address;
determine the first virtual stack corresponding to the source address;
determine a second computer processor corresponding to the destination address and the first virtual stack;
associate a header with the data unit, the header identifying the first virtual stack and the destination address; and
initiate to send the data unit to the second computer processor.

10. The computer program product of claim 9, wherein:
the source address identifies the source switch and a source switch port of the source switch; and
the destination address identifies a destination switch and a destination switch port of the destination switch.

11. The computer program product of claim 8, wherein the embodied program instructions cause the processor to:
create a second virtual stack, comprising assigning a first switch port of a first switch to the second virtual stack; and
create a third virtual stack, comprising assigning a second switch port of the first switch to the third virtual stack,
wherein the processor is restricted from sending data packets received from a switch in the first virtual stack to a switch in the second virtual stack.

12. The computer program product of claim 9, wherein the embodied program instructions to initiate to send the data unit to the second computer processor further causes the processor to:
segment the data unit into one or more cells, each cell comprising a cell header, each cell header comprising the destination address;
initiate to send the one or more cells to the second computer processor via a cell-based network; and
reconstitute, by the second computer processor, the data unit from the one or more cells.

13. A computer system, comprising:
one or more computer processors;
one or more computer-readable storage media having program instructions embodied therewith, the embodied program instructions executable by the one or more computer processors to cause the one or more computer processors to:
receive configuration information identifying at least one virtual stack to create, each of the at least one virtual stack being a logical arrangement of a plurality of switches which operate together as a single switch;
determine a virtual topology for the at least one virtual stack based on the configuration information, the configuration information comprising a quantity of the at least one virtual stack to create and a quantity of switches to assign to each of the at least one virtual stack;

create a first virtual stack of the at least one virtual stack, comprising assigning at least one switch port of a source switch to the first virtual stack of the at least one virtual stack in accordance with the configuration information;
store the virtual topology in a mapping table local to a computer comprising the one or more computer processors;
designate a switch of the plurality of switches as a master switch of the at least one virtual stack;
receive the configuration information from the master switch; and
send the configuration information to at least one other computer processor that manages another virtual stack not managed by the one or more computer processors.

14. The computer system of claim 13, wherein the embodied program instructions cause the one or more computer processors to:
receive, from the source switch, a data unit comprising a source address and a destination address;
determine the first virtual stack corresponding to the source address;
determine a second computer processor corresponding to the destination address and the first virtual stack;
associate a header with the data unit, the header identifying the first virtual stack and the destination address; and
initiate to send the data unit to the second computer processor.

15. The computer system of claim 14, wherein:
the source address identifies the source switch and a source switch port of the source switch; and
the destination address identifies a destination switch and a destination switch port of the destination switch.

16. The computer system of claim 13, wherein the embodied program instructions cause the one or more computer processors to:
create a second virtual stack, comprising assigning a first switch port of a first switch to the second virtual stack; and
create a third virtual stack, comprising assigning a second switch port of the first switch to the third virtual stack,
wherein the one or more computer processors are restricted from sending data packets received from a switch in the first virtual stack to a switch in the second virtual stack.

17. The computer system of claim 14, wherein the embodied program instructions to initiate to send the data unit to the second computer processor further causes the one or more computer processors to:
segment the data unit into one or more cells, each cell comprising a cell header;
initiate to send the one or more cells to the second computer processor via a cell-based network; and
reconstitute, by the second computer processor, the data unit from the one or more cells.

* * * * *